Dec. 13, 1949 D. S. WEISS 2,491,143
COUPLER HOOK
Filed Jan. 17, 1947

INVENTOR
DEWEY S. WEISS
BY
ATTORNEY

Patented Dec. 13, 1949

2,491,143

UNITED STATES PATENT OFFICE 2,491,143

COUPLER HOOK

Dewey S. Weiss, Portland, Oreg.

Application January 17, 1947, Serial No. 722,538

13 Claims. (Cl. 280—33.15)

My present invention comprises a coupler hook for association with a wheeled vehicle in order to attach trailers or the like thereto.

A principal object of the invention is to provide a coupler hook for engagement with drawbars or the like with a guard that may be locked in open or closed position. Many serious accidents have been occasioned by disengagement of the coupler from the coupler hook, which would not be possible with my invention.

Another object of the present invention is to provide a coupler hook having a guard which is positively locked in either open or closed position by simple means not requiring the use of springs or other delicate members which might become damaged and fail in operation.

Another important object of the invention is the provision of coupling means between tractor and trailer comprising a hook and a guard therefor, which guard may be engaged by the thumb and forefinger of one hand in order to move it from open to closed position or vice versa, in combination with a latching device for positively holding the guard in either position which may be manipulated by the index or other fingers of the same hand moving the guard, thereby providing a construction which may be entirely operated with the use of one hand, allowing the other hand to be free to manipulate the drawbar which is to be engaged with the coupler hook.

A further advantage of the present invention is the provision of a durably constructed, guarded coupler hook which comprises relatively few parts, each of simple manufacture, easily assembled with the other parts, and which will not fail in operation.

Numerous other objects and advantages of the invention will be apparent as it is better understood from the following description taken in connection with the accompanying drawings wherein a preferred embodiment of the invention is disclosed.

In the drawings and specification like numerals refer to like parts throughout.

Figure 1:
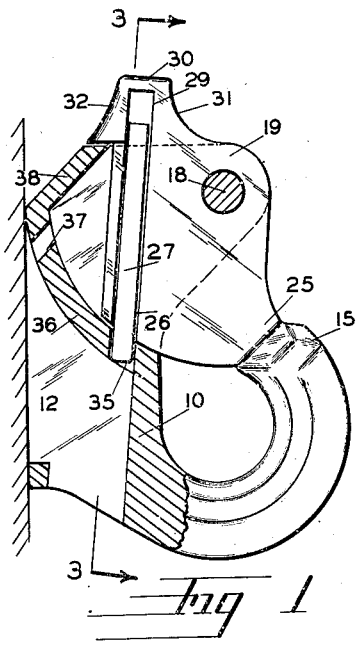
Fig. 1 is a vertical side view partially in section of the preferred embodiment of the invention in its location of use with the guard member latched in closed position.

The coupler hook comprises a body portion 10 including a pair of rearwardly extending plates 11 and 12 having lateral extensions 13 and 14 by means of which the hook may be welded or otherwise affixed to the rear end of a truck or other vehicle. The body member 10 is provided with a hook 15 having its mouth opening upwardly and with which the coupler of a drawbar or the like may be engaged for coupling a trailer with a prime mover. The plates 11 and 12 extend from the shank portion of the hook and form a guard-guiding slot therebetween.

The plates 11 and 12 extend upwardly above the hook and terminate in a pair of spaced ears 16 and 17 in which is mounted a pivot bolt 18 for pivotally supporting a guard 19 in co-operating relation with the hook. The pivot 18 may comprise a bolt having a head at one end and may be locked in position by means of a washer 20 and cotter pin 21 as shown, or by other suitable means.

The guard 19 comprises a plate-like member rotatably mounted upon the pivot 18 and terminates in a hook-engaging face 25 engageable with the tip of the hook 15 in order to close the mouth of the hook.

Figure 2:
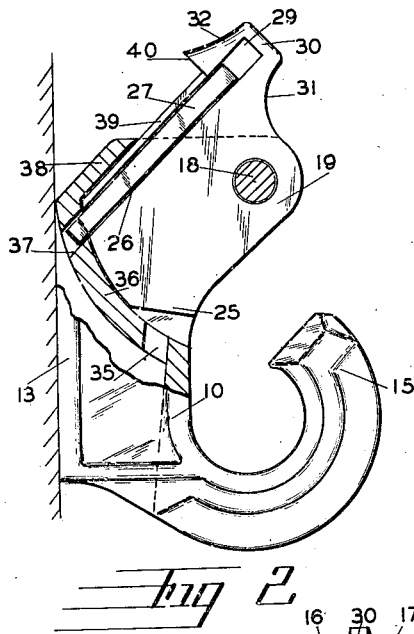
Fig. 2 is a similar view showing the guard member latched in open position.
Figure 3:
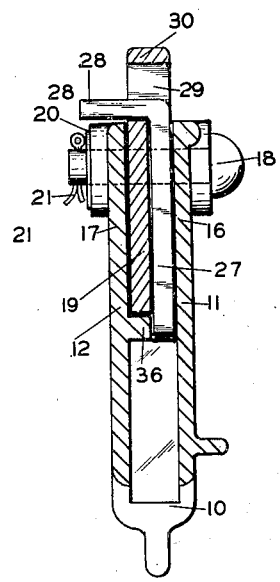
Fig. 3 is a vertical section taken substantially along line 3—3 of Fig. 1.
Figure 4:
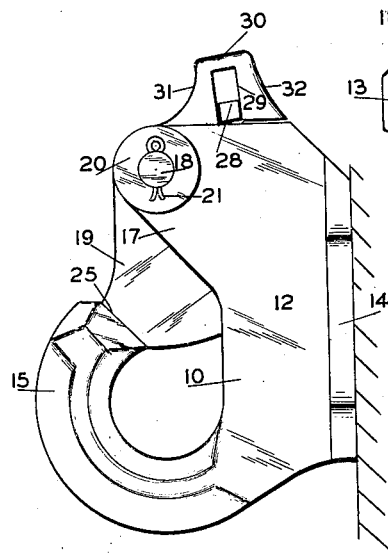
Fig. 4 is a vertical side view of the preferred embodiment of the invention taken from the opposite direction to Figs. 1 and 2.

A groove 26 extends through a portion of the guard 19 and a latchbar 27 is slidably guided therein from latching to non-latching position. The latchbar is preferably a short piece of square bar stock having its upper end laterally bent to form a manually engageable portion 28 which extends laterally from the uppermost portion of the guard through an opening 29 in position to be engageable by the fingers of the manipulator of the guard. The laterally bent portion 28 is confined within an upwardly extending manually engageable portion 30 of the guard and is thus restrained from movement beyond the non-latching position so that, once assembled, the parts of the device cannot become accidentally disassociated. The portion 30 is so shaped as to provide a knob having a thumb recess 31 and a finger recess 32 on its opposite faces thus providing means for grasping the guard with the thumb and forefinger of one hand in order that it may be moved from open to closed position and vice versa. The laterally bent portion 28 of the latchbar is so located as to be easily engageable by the index finger alone or by several of the remaining fingers of the same hand so that the latchbar and guard may be manipulated with one hand while manipulating a drawbar or the like with the other hand. As seen in Fig. 1 the latchbar 27 is engaged in an opening 35 provided within an arcuate rib 36 extending between the side plates 11 and 12. At the upper extremity of the rib 36 there is shown an opening 37 with which the latchbar may be engaged when the guard is moved to open position as seen in Fig. 2. The openings 35 and 37 constitute latchbar-receiving recesses cooperating with the latchbar to retain the guard in open or closed position.

It is to be appreciated that the latchbar is in substantially a vertical position when the guard is in closed position and is inclined approximately 45 degrees from the vertical when the guard is latched in open position so that in either position the weight of the latchbar may be sufficient to cause the latchbar to drop into engagement with the opening 35 or 37. If grit or other foreign substances should prevent such free movement of the latchbar it can, nevertheless, be moved by engagement thereof on opposite sides of the laterally extending portion 28 by the free fingers which are not necessary to manipulate the guard.

The rib 36 preferably terminates at its upper extremity in an overhanging extension 38 engageable with the rear face 39 of the guard so as to limit opening movement of the guard. The knob 30 likewise terminates at its lower rear extremity in a face 40 adapted to abut the tops of plates 11 and 12 and the rib extension 38 so as to operate in conjunction with the portion 25 to limit closing movement of the guard. Thus if the tip of hook 15 becomes worn through hard usage, the face 40 will nevertheless serve to align bar 27 with opening 35.

Figures 5, 6:
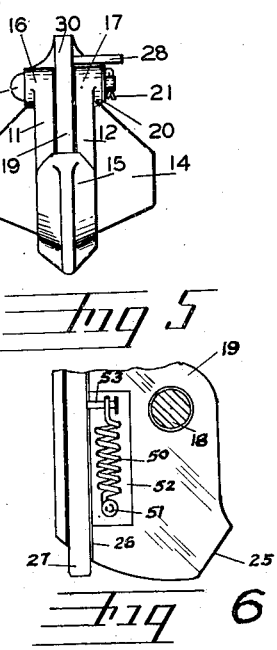
Fig. 5 is a front elevation of the preferred embodiment of the invention on a reduced scale.
Fig. 6 is a partial view in elevation of a modified form of my invention.

In Fig. 6 there is illustrated a modification in which the latchbar is urged into latching position by a spring 50 in addition to the force of gravity. The spring may be tensioned between a pin 51 mounted on the guard 19 in an extension 52 of the slot 26 and a pin 53 mounted on the latchbar 27 and extending into the extension 52. Pulling up on the latchbar further tensions the spring so that it will cause the latchbar to snap into latching position as soon as alignment with one of the openings 35 or 37 is achieved when the latchbar is released.

It is to be appreciated that various details of stiffening ribs and cutout portions to reduce the amount of material utilized in non-stressed areas may be varied according to taste or inclination of the designer. Other changes in construction, detail and arrangement of the device may be apparent to those skilled in the arts to which it belongs. I claim as my invention all such modification in detail and arrangement as come within the scope of the following claims.

I claim:

1. A coupler hook comprising a body member having a hook for engagement with a drawbar coupler or the like, a guard pivotally mounted upon said body member above the open jaw of said hook for closing the mouth of said hook, said guard having a groove therein, a latchbar retained in said groove and movable longitudinally thereof from latching to non-latching positions, and means on said body member engageable with said latchbar to lock said guard in open or closed position, said guard comprising a protruding portion manually engageable to facilitate movement of said guard from one to another position and said groove being so disposed that said latchbar normally tends to move to latching position by the effect of gravity alone.

2. A coupler hook comprising a body portion having a hook for engagement with a drawbar coupler or the like, said body portion comprising a pair of spaced plates extending rearwardly from the shank of said hook to form a guard-guiding slot and upwardly to form a pair of ears overlying said hook, a guard movably guided within said slot, a pivot extending between said ears and carrying said guard, an arcuate rib extending between said spaced plates and having a plurality of openings therethrough, and a latchbar slidably guided in said guard and movable from and into latching position in co-operation with said openings.

3. A coupler hook comprising a body portion having a hook for engagement with a drawbar coupler or the like, said body portion comprising a pair of spaced plates extending rearwardly from the shank of said hook to form a guard-guiding slot and upwardly to form a pair of ears overlying said hook, a guard movably guided within said slot, a pivot extending between said ears and rotatably carrying said guard, a rib extending between said spaced plates and having a plurality of openings therein, and a latchbar carried by said guard and movable longitudinally from and into latching position in co-operation with said openings, said latchbar comprising a laterally extending portion manually engageable to facilitate movement thereof from or to latching or non-latching position.

4. A coupler hook comprising a body portion having a hook for engagement with a drawbar coupler or the like, said body portion comprising a pair of spaced plates extending rearwardly from the shank of said hook to form a guard-guiding slot and upwardly to form a pair of ears overlying said hook, a guard movably guided within said slot, a pivot extending between said ears and carrying said guard, a rib extending between said spaced plates and having a plurality of openings therein, and a latchbar mounted upon said guard and movable from and into latching position in co-operation with said openings, said latchbar comprising a laterally extending portion manually engageable to facilitate movement from or to latching or non-latching position, and said guard comprising a protruding portion manually engageable to facilitate movement of said guard from one to another position.

5. A coupler hook comprising a body portion having a hook for engagement with a drawbar coupler or the like, said body portion comprising a pair of spaced plates extending rearwardly from the shank of said hook to form a guard-guiding slot and upwardly to form a pair of ears overlying said hook, a guard movably guided within said slot, a pivot extending between said ears and carrying said guard, a rib extending between said spaced plates and having a plurality of openings therein, and a latchbar mounted upon said guard and movable from and into latching position in co-operation with said openings, said guard comprising a protruding portion manually engageable to facilitate movement of said guard from one to another position, and said latchbar comprising a manually engageable portion located in proximity to said protruding portion for manipulation of said latchbar by the fingers of the hand engaging said protruding portion.

6. A coupler hook comprising a body portion having a hook for engagement with a drawbar coupler or the like, said body portion comprising a pair of spaced plates extending rearwardly from the shank of said hook to form a guard-guiding slot and upwardly to form a pair of ears overlying said hook, a guard movably guided within said slot, a pivot extending between said ears and carrying said guard, a rib extending between said spaced plates and having a plurality of openings therethrough, and a latchbar mounted upon said guard and movable from and into latching position in co-operation with said openings, said guard comprising a protruding portion manually engageable to facilitate movement of said guard from one to another position, and said latchbar comprising a manually engageable portion located in proximity to said protruding portion for manipulation of said latchbar by the fingers of the hand engaging said protruding portion, said protruding portion comprising a knob having opposite surfaces shaped to receive the thumb and forefinger of the operator.

7. A coupler hook comprising a body portion having a hook for engagement with a drawbar coupler or the like, said body portion comprising a pair of spaced plates extending rearwardly from the shank of said hook to form a guard-guiding slot and upwardly to form a pair of ears overlying said hook, a guard movably guided within said slot, a pivot extending between said ears and carrying said guard, an arcuate rib extending between said spaced plates and having a plurality of openings therethrough, and a latchbar mounted upon said guard and movable from and into latching position in co-operation with said openings, said guard comprising a protruding portion manually engageable to facilitate movement of said guard from one to another position, and said latchbar comprising a manually engageable portion located in proximity to said protruding portion for manipulation of said latchbar by the fingers of the hand engaging said protruding portion, said protruding portion comprising a knob having opposite surfaces shaped to receive the thumb and forefinger of the operator, and said manually engageable portion being of such length as to be engageable by the index and other fingers of the hand engaging said guard.

8. A coupler hook comprising a body portion having a hook for engagement with a drawbar coupler or the like, said body portion comprising a pair of spaced plates extending rearwardly from the shank of said hook to form a guard-guiding slot and upwardly to form a pair of ears overlying said hook, a guard movably guided within said slot, a pivot extending between said ears and carrying said guard, a rib extending between said spaced plates and having a plurality of openings therethrough, and a latchbar mounted upon said guard and movable from and into latching position in co-operation with said openings, said body portion and said guard having complementary abuttable surfaces limiting movement of said guard at extreme positions to align said latchbar with said openings.

9. A coupler hook comprising a body portion having a hook for engagement with a drawbar coupler or the like, said body portion comprising a pair of spaced plates extending rearwardly from the shank of said hook to form a guard-guiding slot and upwardly to form a pair of ears overlying said hook, a guard movably guided within said slot, a pivot extending between said ears and carrying said guard, a rib extending between said spaced plates and having a plurality of openings therethrough, and a latchbar mounted upon said guard and movable from and into latching position in co-operation with said openings, said body portion and said guard having complementary abuttable surfaces limiting movement of said guard at extreme positions to align said latchbar with said openings, said complementary surfaces including a hook-engaging face on said guard.

10. A coupler hook comprising a body portion having a hook for engagement with a drawbar coupler or the like, said body portion comprising a pair of spaced plates extending rearwardly from the shank of said hook to form a guard-guiding slot and upwardly to form a pair of ears overlying said hook, a guard movably guided within said slot, a pivot extending between said ears and carrying said guard, an arcuate rib extending between said spaced plates and having a plurality of openings therethrough, and a latchbar mounted upon said guard and movable from and into latching position in co-operation with said openings, said body portion and said guard having complementary abuttable surfaces limiting movement of said guard at extreme positions to align said latchbar with said openings, said complementary surfaces including a hook-engaging face on said guard and a shoulder on said protruding portion engageable with said body portion when said guard is in closed position.

11. A coupler hook comprising a body member having a hook for engagement with a drawbar coupler or the like, a guard pivotally mounted upon said body member above the open jaw of said hook for closing the mouth of said hook, said guard having a groove therein, a latchbar retained in said groove and movable longitudinally thereof from latching to nonlatching positions, and means on said body member engageable with said latchbar to retain said guard in open or closed position, said guard comprising a protruding portion manually engageable to facilitate movement of said guard from one to another position and said groove being so disposed that said latchbar normally tends to move to latching position by the effect of gravity alone.

12. A coupler hook comprising a body member having a hook for engagement with a drawbar coupler or the like, a guard pivotally mounted upon said body member above the open jaw of said hook for closing the mouth of said hook, said guard having a groove therein, a latchbar retained in said groove and movable longitudinally thereof from latching to nonlatching positions, and means on said body member engageable with said latchbar to lock said guard in closed position, said guard comprising a protruding portion manually engageable to facilitate movement of said guard from one to another position, and said guard being so disposed that said latchbar normally tends to move to latching position by the effect of gravity alone.

13. A coupler hook comprising a body portion having a hook for engagement with a drawbar coupler or the like, said body portion comprising a pair of spaced plates extending rearwardly from the shank of said hook to form a guard-guiding slot and upwardly to form a pair of ears overlying said hook, a guard movably guided within said slot, a pivot extending between said ears and carrying said guard, an arcuate rib extending between said spaced plates and having a plurality of latchbar-receiving recesses therein, and a latchbar slidably guided in said guard and movable from and into latching position in cooperation with said recesses.

DEWEY S. WEISS.

REFERENCES CITED

The following references are of record in the file of this patent:

UNITED STATES PATENTS

| Number | Name | Date |
|---|---|---|
| 1,408,501 | Clement | Mar. 7, 1922 |
| 1,426,134 | Weber | Aug. 15, 1922 |
| 1,491,637 | Schrum | Apr. 22, 1924 |
| 1,739,986 | Reid | Dec. 17, 1929 |
| 2,356,998 | Haniquet | Aug. 29, 1944 |